United States Patent [19]

Sawabe et al.

[11] Patent Number: 5,365,555
[45] Date of Patent: Nov. 15, 1994

[54] WATER LEVEL MEASUREMENT SYSTEM

[75] Inventors: James K. Sawabe; Lamont H. Youngborg, both of San Jose, Calif.

[73] Assignee: General Electric Company, San Jose, Calif.

[21] Appl. No.: 79,079

[22] Filed: Jun. 23, 1993

[51] Int. Cl.$^5$ .......................................... G21C 17/00
[52] U.S. Cl. .................................. 376/258; 376/247; 376/259
[58] Field of Search ............... 376/245, 247, 246, 259, 376/258; 73/708, 716

[56] References Cited

U.S. PATENT DOCUMENTS

| | | | |
|---|---|---|---|
| 4,302,288 | 11/1981 | Youngborg | 376/210 |
| 4,394,346 | 7/1983 | Morooka | 376/258 |
| 4,524,624 | 6/1985 | Di Noia et al. | 73/708 |
| 4,550,611 | 11/1985 | Czarnocki | 73/708 |
| 4,832,900 | 5/1989 | Harbaugh et al. | 376/259 |
| 5,024,802 | 6/1991 | Srinivasan | 376/258 |

OTHER PUBLICATIONS

GE Nuclear Energy, "BWR Reactor Vessel Water Level Instrumentation," Aug. 1992, pp.: cover & back, Table of Contents, and 1-33; NRC Public Document Room.
George Hengerle, five pages of handout notes from 11 Jan. 93 meeting in Orlando, Fla. of GE and BWR Owners Group.
GE Nuclear Energy, "Fuel Zone Water Level Channel Reference Leg Change from the Cold Reference Leg to the Narrow Range Variable Leg," Mar. 5, 1993 proprietary Report to BWROG pp.: 1-27, unpublished.

Primary Examiner—Donald P. Walsh
Assistant Examiner—Meena Chelliah
Attorney, Agent, or Firm—John S. Beulick

[57] ABSTRACT

A system for measuring water level includes a reactor pressure vessel containing a core and steam separator assembly, with the vessel being filled with water to a nominal level above the core. A reference leg contains a column of water having a reference level disposed above the nominal level, and a first variable leg has a first tap disposed in the vessel below the reference and nominal levels. A first monitor is disposed between the reference leg and the first leg for determining differential pressure therebetween to indicate level of the water in the vessel above the first tap. A second variable leg includes a second tap in the vessel below the first tap, and a second monitor is disposed between the first and second legs for determining differential pressure therebetween to indicate level of water in the vessel between the first and second taps when the water level falls below the first tap.

15 Claims, 2 Drawing Sheets

WATER LEVEL MEASUREMENT SYSTEM

BACKGROUND OF THE INVENTION

A boiling water reactor (BWR) includes a pressure vessel containing a nuclear reactor core above which is disposed a conventional steam separator assembly and in turn a steam dryer. The vessel is partially filled with water to a normal level above the core and within the steam separator assembly, with the core being effective for heating the water therein to generate steam which rises upwardly into the steam separator which removes a portion of moisture therefrom, with the steam dryer removing additional moisture prior to discharging the steam from the pressure vessel for powering a steam turbine for example.

In order to maintain the normal level of water in the pressure vessel, the level must be monitored so that various systems may be actuated when required as the water level varies. In order to measure the water level, the fundamental fluid hydrostatic relationship between pressure differential relative to height in a liquid reservoir is used. A reference leg or pipe is joined to the pressure vessel above the water normal level and contains a substantially constant column height of water therein, and a variable leg or pipe is also joined to the vessel below the normal level with a conventional differential pressure monitor or level transmitter being joined between the two legs. By measuring differential pressure between the two legs, the level of the water in the vessel may be determined relative to the reference leg in a conventionally known manner.

In order to passively maintain the constant height column of water in the reference leg, the reference leg includes a conventional cold condensing chamber at its top end which is joined to a downwardly inclined steam leg or pipe joined to the vessel. In this way, the steam in the pressure vessel flows upwardly through the steam leg and into the condensing chamber where it condenses to continually maintain the condensing chamber and reference leg joined thereto filled with water to a predetermined level, with any excess condensate in the condensing chamber spilling downwardly back into the vessel through the downwardly inclined steam leg.

A typical BWR has many ranges of water level monitoring, and therefore corresponding variable legs and differential pressure monitors. In one design for example, one variable leg includes a pressure tap in the pressure vessel at an elevation below the inlet tap for the steam leg near the bottom of the steam separator, to which is joined a conventionally known narrow range (NR) monitor calibrated for accurately measuring water level as it varies within a relatively small percentage of the total height of the vessel or from the normal vessel water level. Another variable leg includes a pressure tap located in the vessel below the NR pressure tap near the top of the active fuel in the reactor core, to which is joined a conventionally known wide range (WR) monitor effective for measuring water level from the normal level or top of the NR range down to about the WR pressure tap. Yet another variable leg is provided with a pressure tap in the vessel at an elevation below the WR pressure tap and below the bottom of the active fuel in the reactor core near the bottom of the pressure vessel to which is joined a conventionally known fuel zone range (FZR) monitor effective for monitoring water level in the vessel down to about the FZR pressure tap. The monitors conventionally join each of these variable legs to the common reference leg in order to monitor water level relative thereto based on the differential pressures monitored from which the water level may be conventionally determined relative to the known water level in the reference leg.

In this exemplary embodiment, the NR monitor is primarily used for feedwater control, certain reactor trips based on water level, and for the automatic depressurization system permissive. The WR monitor is used for reactor core trips associated with the main steamline isolation and emergency core cooling system. The FZR monitor is used for indicating water level in the core range, and for containment spray permissive in some plants. The three monitors are each calibrated for accurately monitoring water level within preferred ranges, with the ranges typically overlapping to ensure continuous water level monitoring throughout the entire elevation range as desired. Of course, various BWRs use various numbers of water level monitors for controlling operation of the reactor and various subsystems as required. However, all such conventional water level monitors use a variable leg joined to a common, constant reference leg by the differential pressure monitor for determining water level.

Observations at certain operating plants have shown that the vessel water level monitors may spuriously read falsely high water levels for short periods during slow depressurization of the pressure vessel in preparation for a maintenance outage. This temporary false increase in level measurement is also referred to as a notch in the indicated vessel water level which has been found to be plant dependent, with some plants not experiencing a notch, and other plants experiencing a notch having a duration from a few seconds to about a couple minutes, with the notch being observed at reactor vessel pressures less than about 450 psig (32 kg/cm$^2$g). The magnitude of the notch varies from about 4 to 8 inches (10 to 20 cm) for example. And, the frequency of occurrence of the notch also varies. The notch is undesirable since the accuracy of the water level is reduced and falsely reads high.

SUMMARY OF THE INVENTION

A system for measuring water level includes a reactor pressure vessel containing a core and a steam separator assembly, with the vessel being filled with water to a nominal level above the core. A reference leg contains a column of water having a reference level disposed above the nominal level, and a first variable leg has a first tap disposed in the vessel below the reference and nominal levels. A first monitor is disposed between the reference leg and the first leg for determining differential pressure therebetween to indicate level of the water in the vessel above the first tap. A second variable leg includes a second tap in the vessel below the first tap, and a second monitor is disposed between the first and second legs for determining differential pressure therebetween to indicate the level of water in the vessel between the first and second taps when the water level falls below the first tap.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
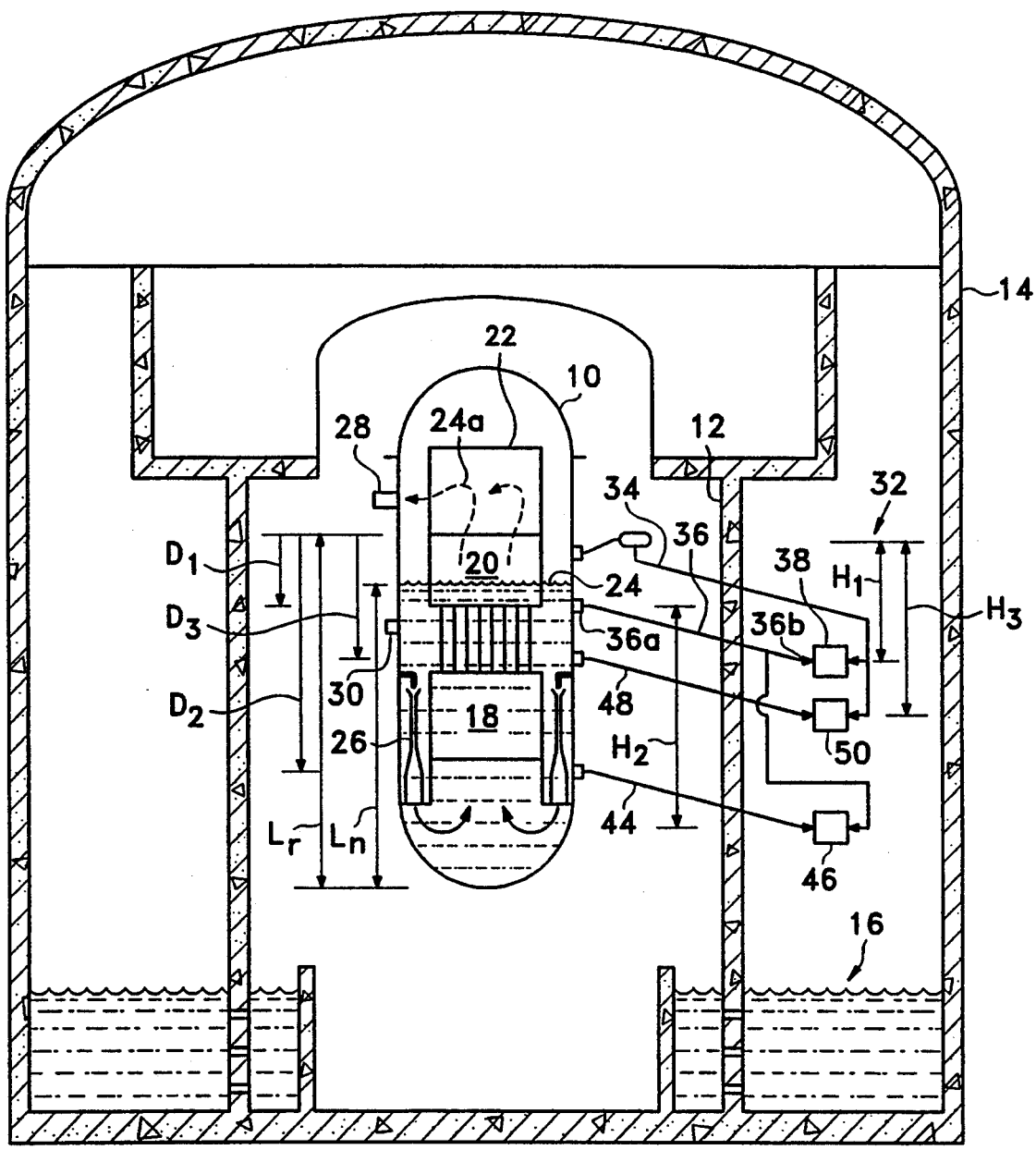
FIG. 1 is an elevational schematic, partly sectional view of an exemplary boiling water reactor plant containing a pressure vessel and a water level measurement system therefor in accordance with one embodiment of the present invention.

Illustrated schematically in FIG. 1 is an exemplary boiling water reactor (BWR) plant conventionally including a reactor pressure vessel 10 disposed in a drywell 12 which in turn is disposed in a containment vessel 14, with a wetwell or suppression pool 16 contained therein. The vessel 10 conventionally includes a nuclear reactor core 18 and a steam separator assembly 20 disposed thereabove, with a steam dryer 22 disposed above the separator assembly 20. The vessel 10 is filled with water 24 to a normal or nominal level $L_n$ at an elevation suitably above the core 18 which is typically within the intermediate region of the steam separator assembly 20.

The vessel 10 conventionally includes additional components such as, jet pumps 26 located in the annular downcomer region circumferentially surrounding the core 18 for circulating the water 24 upwardly through the core 18. The core heats the water for generating steam 24a which flows upwardly into the steam separator assembly 20. Moisture is removed from the steam 24a in the assembly 20, and additional moisture is removed therefrom in the dryer 22, as is conventionally known, prior to discharging the steam 24a from the vessel 10 through a conventional main steam nozzle 28. The vessel 10 also includes conventional feedwater nozzles 30 which channel relatively cold feedwater into the vessel 10, the feed water being discharged above the core 18, when required, from conventional spargers (not shown).

During operation of the reactor illustrated in FIG. 1, the level L of the water 24 in the vessel 10 is maintained at the nominal level $L_n$ well above the core 18 and at the required location through the steam separator assembly 20. Since the water level L will vary during operation, it must be monitored so that the nominal level may be maintained as well as for providing a water level signal to various conventional safety systems which may be activated as required in the event of deviations of the water level from the nominal level $L_n$.

In accordance with the present invention, a system 32 is provided for measuring the water level L in the vessel 10 which, therefore, is a part thereof. The system 32 further includes a reference leg or pipe 34 containing a predetermined and substantially constant reference column of water therein having a first reference height $H_1$, with a top or reference level $L_r$ disposed vertically above the nominal level $L_n$ of the reactor water 24 in the vessel 10. A first or narrow range (NR) variable leg or pipe 36 includes a first or upper pressure tap 36a disposed in flow communication with the vessel 10 at a predetermined first death or level $D_1$ below the reference level $L_r$ and below the nominal level $L_n$, and further includes a first upper port 36b preferably disposed below the first tap 36a. A first differential pressure monitor 38, also referred to as a level transmitter, is disposed in flow communication with the reference leg 34 and the first port 36b of the first leg 36 for determining differential pressure therebetween to indicate the level L of the water in the vessel 10 above the first tap 36a. The reference leg 34, the first variable leg 36, and the first monitor 38 are conventionally configured and function conventionally for monitoring and indicating the level L of the water 24 in the vessel 10 using the fundamental fluid hydrostatic relationship of the pressure gradient in a fluid at rest being directly proportional to its density, with the pressure difference in the fluid at corresponding elevations therein being interrelated. Accordingly, by measuring the differential pressure between a known constant column of water, i.e. in the reference leg 34, and the pressure in a varying column of water represented by the level L of the water 24 in the vessel 10 as measured at the first port 36b, an accurate indication of the level L in the vessel 10 may be determined in a conventional fashion.

Figure 2:
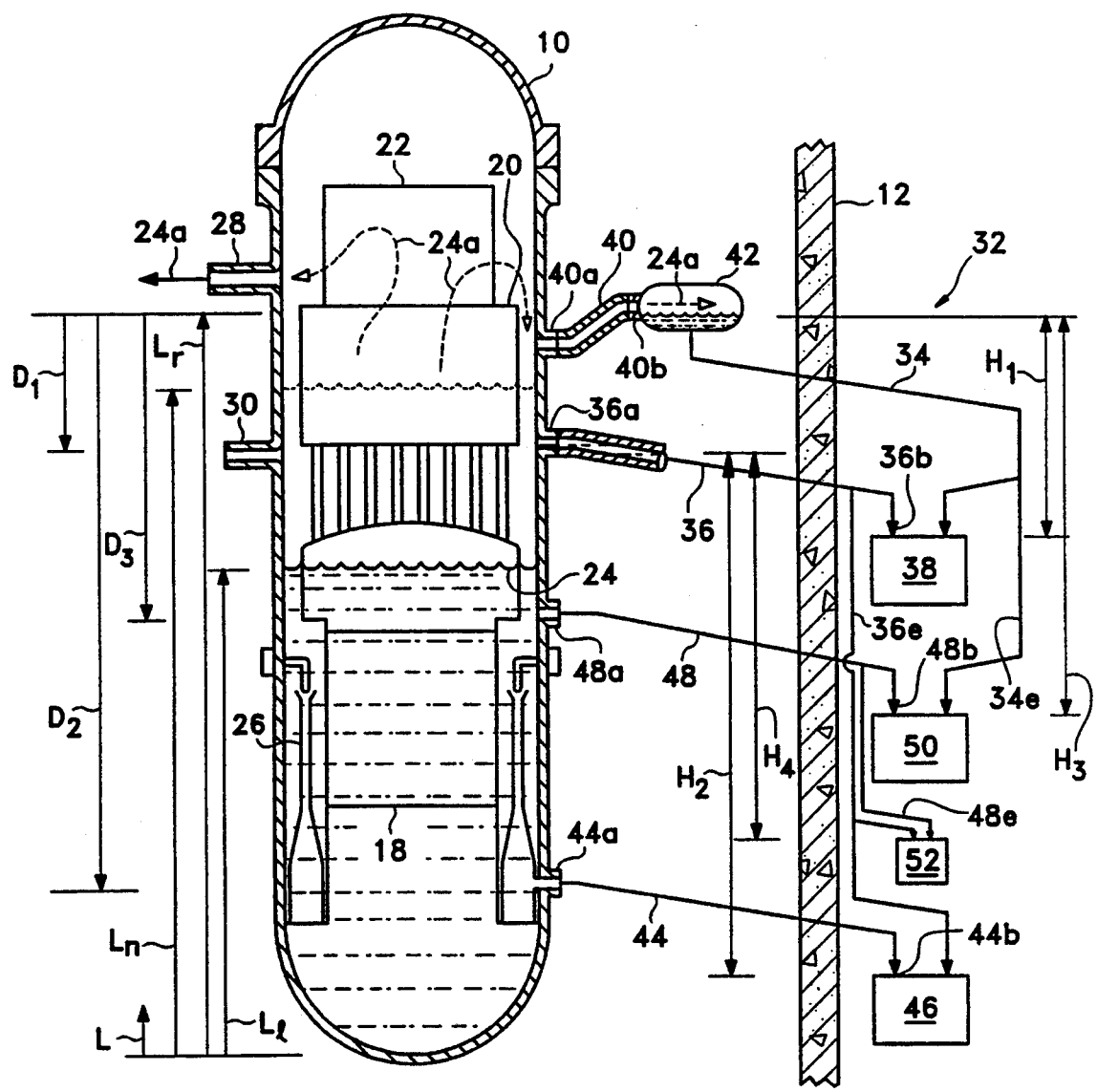
FIG. 2 is an enlarged elevational view of the pressure vessel and water level measurement system illustrated in FIG. 1.

FIG. 2 illustrates in more particularity the system 32 which further includes a conventional, thermally insulated steam leg or pipe 40 having an inlet port or tap 40a disposed in flow communication with the vessel 10 above the first tap 36a and above the nominal level $L_n$ of the water 24, shown in phantom in FIG. 2. The steam leg 40 further includes an outlet port 40b which is preferably disposed above the inlet port 40a so that the steam leg 40 is inclined upwardly away from the vessel 10. A conventional cold condensing chamber 42 has an inlet disposed in flow communication with the steam leg outlet port 40b for receiving steam 24a therethrough from the vessel 10 to form condensate in the relatively cold chamber 42 for maintaining the reference level $L_r$ therein. The chamber 42 also includes an outlet at a bottom thereof disposed in flow communication with the reference leg 34 for discharging thereto the condensate formed in the condensing chamber 42. As the steam 24a condenses in the chamber 42 it will partially fill the chamber 42 until the water level reaches the steam leg outlet port 40b, with the excess condensate spilling from the chamber 42 downwardly by gravity through the steam leg 40 for return to the vessel 10. In this way, the column of water in the reference leg 34 is maintained substantially constant and provides the reference level $L_r$.

The reference leg 34, the cooperating steam leg 40, and the condensing chamber 42 are conventional in structure and in operation. Accurate measurement of the water level L in the vessel 10 requires that the column of water in the reference leg 34 be accurately maintained by the condensing chamber 42. However, it has been observed in some operating nuclear reactor plants, that upon depressurization of the vessel 10 under certain conditions, for example, below about 32 kg/cm²g, that water level measurement may temporarily falsely read high as indicated above in the Background section. It has been discovered that this aberration appears to be caused by bubbles being buoyed upwardly from the reference leg 34 due to degassing of non-condensable gas dissolved in solution therein. The vessel 10 conventionally includes a non-condensable gas such as oxygen and hydrogen which over the course of time, for example, several months, flows through the steam leg 40 into the condensing chamber 42 wherein the concentration of non-condensable gas therein becomes relatively high and enters into solution into the water therein. Upon depressurization of the vessel 10, it is believed that the non-condensable gas begins to degas from the water in the reference leg 34, decreasing its effective density and thereby artificially reducing the effective height $H_1$ thereof, and the reference level $L_r$, which results in an artificially high water level reading from the first monitor 38 for example.

In accordance with the present invention, a second variable leg or pipe 44 is provided below the first variable leg 36 and has a second, or lower, pressure tap 44a disposed in flow communication with the vessel 10 through the bottom skirt of one of the jet pumps 26, for example, at a predetermined second level or depth $D_2$ below the reference level $L_r$, below the nominal level $L_n$, and below the first tap 36a. The second variable leg 44 further includes a second or lower port 44b disposed below the second tap 44a so that the second variable leg 44 is inclined downwardly away from the vessel 10. A second differential pressure monitor 46 is disposed in flow communication with the first leg 36 and the second port 44b of the second variable leg 44 in accordance with the present invention for determining differential pressure therebetween to indicate the level L of the water 24 in the vessel 10 between the first and second taps 36a, 44a when the water level falls below the first tap 36a to a lower level $L_1$ shown in solid line in FIG. 2. The first leg 36 is inclined downwardly away from the vessel 10 for containing the reactor water 24 therein up to the first tap 36a to provide a predetermined second reference column of water having a second height $H_2$ for the second monitor 46. The second monitor 46 is joined to the first variable leg 36 at any suitable location between the first tap 36a and first port 36b by an extension leg 36e thereof.

But for the extension leg 36e joining the second monitor 46 to the first variable leg 36, both the second monitor 46 and the second variable leg 44 are conventional in configuration and function, with the second monitor 46 also being conventionally known as a fuel zone range (FZR) monitor 46 since the second tap 44a is disposed below the active fuel of the core 18, with the first tap 36a being disposed substantially above the top of the active fuel of the core 18. In this way, the water level L within the core 18 may be accurately measured. In a conventional water level measurement system, the second monitor 46 is not connected to the first variable leg 36, but is instead connected directly to the reference leg 34. The level measurement ranges of the first monitor 38 and the second monitor 46 are then suitably selected and calibrated for measuring the water level L in the vessel 10. Since both monitors 38 and 46 are joined to the common reference leg 34 in a conventional system, the spurious level measurement notch discussed above will occur in both monitors. However, in accordance with the present invention, by using the first variable leg 36 instead of the constant reference leg 34 with the second monitor 46, the notch problem will be reduced or eliminated.

More specifically, since the notch problem appears to be caused by the degassing of non-condensable gas in the reference leg 34, using the first variable leg 36 instead will improve level measurement in the monitor 46. During normal operation when the normal level $L_n$ of the water 24 is maintained in the vessel 10 as illustrated in phantom line in FIG. 2, the first tap 36a is normally underwater, which prevents the non-condensable gas within the vessel 10 from accumulating in any portion of the first variable leg 36. This is in contrast to the reference leg 34 which communicates with the vessel 10 through the steam leg 40 and condensing chamber 42 which allow the non-condensable gas to accumulate in the chamber 42 over time and increase the concentration of the gas in the water contained in the reference leg 34.

During abnormally low levels of the water 24 within the vessel 10 when the accuracy of its measurement is most important, the second monitor 46 in accordance with the present invention provides improved accuracy by using the first variable leg 36 instead of the reference leg 34. Once the level of the water 24 drops below the first tap 36a, the second monitor 46 may then be used to accurately indicate the water level L in the vessel 10 using the first variable leg 36 which is now filled with reactor water up to the first tap 36a with the predetermined water column height $H_2$. Of course, by joining the second monitor 46 to the first variable leg 36 instead of the reference leg 34, the second monitor 46 is ineffective for measuring water level when the level is above the first tap 36a, in this case the water level being measured instead by the first monitor 38.

The system 32 preferably also includes a third variable leg or pipe 48 having a third or middle pressure tap 48a disposed in flow communication with the vessel 10 at a predetermined third level or depth $D_3$ below the reference level $L_r$ and below the first tap 36a, and above the second tap 44a, with the third leg 48 also including a third or middle port 48b which is disposed below the third tap 48a. A third differential pressure monitor 50 is disposed in flow communication with the reference leg 34 and the third port 48b of the third leg 48 for determining differential pressure therebetween to indicate level L of the water 24 in the vessel 10 above the third tap 48a. The third monitor 50 is joined to the reference leg 34 by an extension 34e thereof to provide a predetermined reference column of water having a height $H_3$ for use as a reference for measuring water level in the vessel 10 down to the third tap 48a. The third variable leg 48 and the third monitor 50 are conventional in configuration and function, with the third monitor 50 also being conventionally referred to as a wide range (WR) monitor 50. In this way, the three monitors 38, 46, and 50 may be calibrated for use over different as well as overlapping vertical ranges.

In the exemplary embodiment illustrated in FIG. 2, the first tap 36a is disposed adjacent to the steam separator assembly 20, at the bottom thereof for example, the third tap 48a is disposed adjacent the top of the core 18 and above the second tap 44a, which is disposed below the core 18. In this way, the first or NR monitor 38 indicates the water level L from the nominal level $L_n$ down to about the first tap 36a, the third or WR monitor 50 indicates the water level L from the nominal level $L_n$ down to about the third tap 48a, and the second or FZR monitor 46 indicates the water level L from about the first tap 36a down to about the second tap 44a when the level drops below the first tap 36a. This arrangement of the taps 36a, 44a, and 48a and the operating ranges of the three monitors 38, 46, and 50 is conventional except for joining the second monitor 46 to the first variable leg 36 through the extension 36e thereof instead of to the reference leg 34, such as the third monitor 50 joined thereto through the extension 34e. In this way, the three monitors 38, 46, and 50 may be conventionally used to monitor water level in the vessel 10 and control conventional safety systems as desired.

Since the third monitor 50 uses the reference leg 34, the notch problem can still effect the accuracy of water level measurement therefrom. Accordingly, for those plants which require safety related low water level trips generated by the wide range third monitor 50, the system 32 may further include a fourth differential pressure monitor 52 disposed in flow communication between the first variable leg 36 and the third variable leg 48 for determining differential pressure therebetween to indicate level of the water in the vessel 10 between the first and third taps 36a, 48a when the water level falls below the first tap 36a. In this embodiment, the fourth monitor 52 is suitably joined through an extension 48e of the third variable leg 48 to provide a predetermined reference column of water having a height $H_4$ up to the first tap 36a, and suitably joined to the first variable leg extension 36e. Although the fourth monitor 52 is unable to measure water level when it is above the first tap 36a, when the water level drops below the first tap 36a the reference column of water captured in the first variable leg 36 is used for the fourth monitor 52, as it is for the second monitor 46, for more accurately determining water level in the vessel 10. As shown in FIG. 2, the reference leg 34 and the variable legs 36, 44, and 48 are all preferably inclined downwardly away from the vessel 10 to allow any gas bubbles therein to escape by being buoyed upwardly for return to the vessel 10, with the first variable leg 36 also being inclined downwardly for capturing water therein to provide the reference column heights $H_2$, $H_4$ when the water level in the vessel 10 drops below the first tap 36a.

If desired, the signals from the monitors 38 and 50 may be conventionally automatically analyzed by electronic means to detect the well known notching signature and provide an alarm for the plant operator.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A system for measuring water level comprising:
   a reactor pressure vessel containing a nuclear reactor core and a steam separator assembly disposed thereabove, said vessel being fillable with water to a nominal level above said core;
   a reference leg for containing a predetermined first reference column height of water having a reference level disposed vertically above said nominal level;
   a first variable leg having a first tap disposed in flow communication with said vessel at a predetermined first depth below said reference level and below said nominal level and adjacent said steam separator assembly, and further having a first port;
   a first monitor disposed in flow communication with said reference leg and said first port for determining differential pressure therebetween to indicate level of said water in said vessel above said first tap;
   a second variable leg having a second tap disposed in flow communication with said vessel at a predetermined second depth below said reference level, said nominal level, and said first tap, and further having a second port; and
   a second monitor disposed in flow communication with said first leg and said second port for determining differential pressure therebetween to indicate level of said water between said first and second taps when said water level falls below said first tap, with said first leg being inclined downwardly for containing water therein up to said first tap to provide a predetermined second reference column height for said second monitor.

2. A system according to claim 1 further comprising:
   a steam leg having an inlet port disposed in flow communication with said vessel above said first tap and said nominal level, and further having an outlet port; and
   a condensing chamber having an inlet disposed in flow communication with said steam leg outlet port for receiving steam therethrough from said vessel to form condensate in said chamber, and an outlet disposed in flow communication with said reference leg for discharging thereto said condensate.

3. A system according to claim 2 wherein said first tap is disposed above said core, and said second tap is disposed below said core.

4. A system according to claim 3 further comprising:
   a third variable leg having a third tap disposed in flow communication with said vessel at a predetermined third depth below said reference level and said first tap, and above said second tap, and further having a third port; and
   a third monitor disposed in flow communication with said reference leg and said third port for determining differential pressure therebetween to indicate level of said water in said vessel above said third tap.

5. A system according to claim 4 wherein said third tap is disposed adjacent the top of said core and said second tap so that said first monitor indicates said water level from said nominal level down to about said first tap, said third monitor indicates said water level from said nominal level down to about said third tap, and said second monitor indicates said water level from about said first tap down to about said second tap.

6. A system according to claim 5 further comprising a fourth monitor disposed in flow communication between said first and third legs for determining differential pressure therebetween to indicate level of said water in said vessel between said first and third taps when said water level falls below said first tap.

7. A system for measuring the level of water inside a reactor pressure vessel containing a fuel core and a steam separator assembly arranged above said fuel core, said reactor pressure vessel having a normal water level at a predetermined height between said steam separator assembly and said fuel core, comprising:
   first, second and third taps arranged in flow communication with the inside of said reactor pressure vessel, said first tap being located at a height higher than said predetermined height, said second tap being located at a height lower than said predetermined height and adjacent to said steam separator assembly, and said third tap being located at a height lower than the height of said second tap;
   a steam leg having a lower port at one end in flow communication with said first tap and an upper port at the other end, said lower port of said steam leg being located at a height lower than a height of said upper port of said steam leg; and
   means for condensing steam passing through said steam leg into water, said steam condensing means being in flow communication with said upper port of said steam leg;

a reference leg having an upper port at one end in flow communication with said steam condensing means and a lower port at the other end, said lower port of said reference leg being located at a height lower than a height of said upper port of said reference leg, said reference leg being fillable with water to a reference level located at a height higher than said predetermined height;

a first variable leg having an upper port at one end in flow communication with said second tap and a lower port at the other end, said lower port of said first variable leg being located at a height lower than a height of said upper port of said first variable leg;

a second variable leg having an upper port at one end in flow communication with said third tap and a lower port at the other end, said lower port of said second variable leg being located at a height lower than a height of said upper port of said second variable leg;

a first extension leg having an upper port at one end in flow communication with said first variable leg and a lower port at the other end, said lower port of said first extension leg being located at a height lower than a height of said upper port of said first extension leg;

a first differential pressure monitor having a first input in flow communication with said lower port of said reference leg and a second input in flow communication with said lower port of said first variable leg; and a second differential pressure monitor having a first input in flow communication with said lower port of said extension leg and a second input in flow communication with said lower port of said second variable leg.

8. The system as defined in claim 7, wherein said third tap is located at a height lower than said core.

9. The system as defined in claim 7, further comprising:

a fourth tap arranged in flow communication with the inside of said reactor pressure vessel, said fourth tap being located at a height lower than said predetermined height and higher than the height of said third tap;

a third variable leg having an upper port at one end in flow communication with said fourth tap and a lower port at the other end, said lower port of said third variable leg being located at a height lower than a height of said upper port of said third variable leg;

a second extension leg having an upper port at one end in flow communication with said reference leg and a lower port at the other end, said lower port of said second extension leg being located at a height lower than a height of said upper port of said second extension leg; and a third differential pressure monitor having a first input in flow communication with said lower port of said second extension leg and a second input in flow communication with said lower port of said third variable leg.

10. The system as defined in claim 9, further comprising:

a third extension leg having an upper port at one end in flow communication with said third variable leg and a lower port at the other end, said lower port of said third extension leg being located at a height lower than a height of said upper port of said third extension leg;

a fourth extension leg having an upper port at one end in flow communication with said first extension leg and a lower port at the other end, said lower port of said fourth extension leg being located at a height lower than a height of said upper port of said fourth extension leg; and a fourth differential pressure monitor having a first input in flow communication with said lower port of said third extension leg and a second input in flow communication with said lower port of said fourth extension leg.

11. A system for measuring the level of water inside a reactor pressure vessel containing a fuel core and a steam separator assembly arranged above said fuel core, said reactor pressure vessel having a normal water level at a predetermined height between said steam separator assembly and said fuel core, comprising:

first and second taps arranged in flow communication with the inside of said reactor pressure vessel, said first tap being located at a height lower than said predetermined height and adjacent to said steam separator assembly, and said second tap being located at a height lower than the height of said first tap;

a reference leg having an upper port at one end and a lower port at the other end, said lower port of said reference leg being located at a height lower than a height of said upper port of said reference leg, said reference leg being fillable with water to a reference level located at a height higher than said predetermined height;

a first variable leg having an upper port at one end in flow communication with said first tap and a lower port at the other end, said lower port of said first variable leg being located at a height lower than a height of said upper port of said first variable leg;

a second variable leg having an upper port at one end in flow communication with said second tap and a lower port at the other end, said lower port of said second variable leg being located at a height lower than a height of said upper port of said second variable leg;

a first extension leg having an upper port at one end in flow communication with said first variable leg and a lower port at the other end, said lower port of said first extension leg being located at a height lower than a height of said upper port of said first extension leg;

a first differential pressure monitor having a first input in flow communication with said lower port of said reference leg and a second input in flow communication with said lower port of said first variable leg; and a second differential pressure monitor having a first input in flow communication with said lower port of said extension leg and a second input in flow communication with said lower port of said second variable leg.

12. The system as defined in claim 11, further comprising:

a third tap arranged in flow communication with the inside of said reactor pressure vessel, said third tap being located at a height higher than said predetermined height;

a steam leg having a lower port at one end in flow communication with said third tap and an upper port at the other end, said lower port of said steam leg being located at a height lower than a height of said upper port of said steam leg; and means for condensing steam passing through said steam leg into water, said steam condensing means being in flow communication with said upper port of said steam leg and with said upper port of said reference leg.

13. The system as defined in claim 11, wherein said second tap is located at a height lower than said core.

14. The system as defined in claim 11, further comprising:

a fourth tap arranged in flow communication with the inside of said reactor pressure vessel, said fourth tap being located at a height lower than said predetermined height and higher than the height of said second tap;

a third variable leg having an upper port at one end in flow communication with said fourth tap and a lower port at the other end, said lower port of said third variable leg being located at a height lower than a height of said upper port of said third variable leg;

a second extension leg having an upper port at one end in flow communication with said reference leg and a lower port at the other end, said lower port of said second extension leg being located at a height lower than a height of said upper port of said second extension leg; and a third differential pressure monitor having a first input in flow communication with said lower port of said second extension leg and a second input in flow communication with said lower port of said third variable leg.

15. The system as defined in claim 14, further comprising:

a third extension leg having an upper port at one end in flow communication with said third variable leg and a lower port at the other end, said lower port of said third extension leg being located at a height lower than a height of said upper port of said third extension leg;

a fourth extension leg having an upper port at one end in flow communication with said first extension leg and a lower port at the other end, said lower port of said fourth extension leg being located at a height lower than a height of said upper port of said fourth extension leg; and a fourth differential pressure monitor having a first input in flow communication with said lower port of said third extension leg and a second input in flow communication with said lower port of said fourth extension leg.

* * * * *